United States Patent

Iana et al.

Patent Number: 5,156,737
Date of Patent: Oct. 20, 1992

[54] ORALLY OPERABLE, PORTABLE, WATER FILTRATION DEVICE

[75] Inventors: E. Charles Iana, 24 Bellevue Ave., Winchester, Mass. 01890; Michael R. McCray, Little Elm, Tex.

[73] Assignee: E. Charles Iana, Winchester, Mass.

[21] Appl. No.: 683,426

[22] Filed: Apr. 11, 1991

[51] Int. Cl.⁵ .............................................. B01D 24/08
[52] U.S. Cl. ..................... 210/266; 210/288; 210/317; 210/321.84; 210/501
[58] Field of Search ............ 210/266, 282, 317, 321.84, 210/501, 502.1

[56] References Cited

U.S. PATENT DOCUMENTS 4,995,976  2/1991  Vermes et al. .................. 210/501 X

*Primary Examiner*—Frank Spear
*Attorney, Agent, or Firm*—Kriegsman & Kriegsman

[57] ABSTRACT

An orally operable, portable, water filtration device. The device includes an elongated tube having an inlet end and an outlet end. The inlet end includes a screen whose openings are in the form of slits. The slits have a width of about 0.005±0.003 inch and filter out pollutants of at least that size. The tube also has an integrally formed internal ledge onto which is disposed a porous polypropylene membrane having a pore size of about 5-8 microns. A bed of granulated activated carbon with a grind size of 1230 is disposed inside the tube between the inlet end and the porous polypropylene membrane in a 7:1 ratio (bed height:bed diameter). A mouthpiece, which has an inlet and an outlet, is mounted over the outlet end of the elongated tube so that the mouthpiece and the elongated tube are in fluid communication. To use the device, the inlet end of the tube is inserted into water and suction is applied to the outlet of the mouthpiece.

12 Claims, 1 Drawing Sheet

ORALLY OPERABLE, PORTABLE, WATER FILTRATION DEVICE

BACKGROUND OF THE INVENTION

The present invention relates to an orally operable, portable, water filtration device.

With each passing day, man-made chemicals and contaminants are introduced into our water supply. Many of these pollutants are unhealthful to drink and/or adversely affect the taste of water. Typically, travelers, hunters, and the like who wish to filter their water use some sort of orally operable, portable, water filtration device, such as a water filtration straw, which removes the pollutants from the water as it is sucked through the straw to the user's mouth. One type of water filtration straw comprises a hollow elongated tube. A porous material, such as felt or foam is inserted into the bottom end of the tube and is held in place by a screen mounted on the bottom end of the tube. Additional foam or felt is inserted into the top end of the tube and is held in place by a second screen mounted thereover. Filter material, such as granulated activated carbon, is disposed within the tube between the foam and/or felt materials.

In U.S. Pat. No. 4,767,544 to Hamblin, an orally operable water filter is described. The water filter includes an outer covering formed of a flexible, water impervious material and which defines an elongate enclosure. A flexible microporous filter membrane, having a pore size of not more than one micron, is disposed within the elongate enclosure and divides the enclosure into respective fluid inlet and fluid outlet compartments, such that the outlet may be placed in the mouth of the user and fluid inlet may be contacted with a source of water to be filtered by drawing the water through the filter using oral suction. Furthermore, the filter includes a flexible separator, disposed at least in the outlet compartment, for preventing the blocking of fluid over the surface of the filter membrane.

In U.S. Pat. No. 4,298,475 to Gartner, a portable water purifier is described. The water purifier comprises an elongated tube having a diameter of a size as to allow suction to be applied by a user's mouth, the tube having an interior conduit connecting an upper outlet and a lower inlet, the conduit having successive adjacent sections from the inlet and the outlet, a first section containing a primary filter material for removing particulate matter, a second section containing an iodinated cation ion exchange resin for removing harmful bacteria, viruses, and the like, a third section containing a secondary filtration material for removing additional particulate material, a fourth section containing activated carbon granules for removing undesirable odors, tastes and hydrocarbons, and a fifth section containing a secondary filter material for removing substantially all remaining particulate matter, whereby on the application of suction when the lower inlet is inserted into a source of contaminated water, the contaminated water is treated to permit the ingestion of water directed from the upper outlet.

In U.S. Pat. No. 1,333,011 to Crady, an individual filter is described. The individual filter comprises a pair of detachable sections telescopically arranged, one of which is provided with a mouth piece, each of the sections being provided at their outer ends with permanently attached screens, while their opposed or inner ends are provided with removable screens, the sections having the space between the screens filled with a filtering element preferably in the form of charcoal. The removable screens are each composed of a ring with a fine wire mesh secured to one edge thereof and a loop also secured to the rings for the purpose of providing for the convenient removal of the screens, the screens being held in position within the tubular members by screws or other fastening devices passing through the members and engaging the rings.

In U.S. Pat. No. 1,000,332 to Dyer, a pocket filter is described. The pocket filter comprises a tubular body, end foraminous cap members carried thereon, filtering material interposed between the cap members, a telescopic member secured to the tubular body and adapted to prevent displacement of one of the caps, one section of the telescopic member being provided with a slot adjacent to one terminal thereof, and a foraminous member adapted to be received by the slot, the member being prevented from displacement by the tubular body as set forth.

Other patents of interest include U.S. Pat. Nos. 4,894,154, 4,769,143, 4,578,187, 4,505,310, 4,369,512, and 4,309,992.

SUMMARY OF THE INVENTION

It is an object of the present invention to provide a new and improved orally operable, portable, water filtration device.

It is another object of the present invention to provide an orally operable, portable, water filtration device having a minimal number of parts.

It is still another object of the present invention to provide an orally operable, portable, water filtration device which is easy to assemble, which can be mass produced, and which is easy to use.

An orally operable, portable, water filtration device constructed according to the teachings of the present invention comprises an elongated tube having an inlet end and an outlet end, the inlet end including an integrally formed screen. A porous membrane is mounted inside the elongated tube proximate to the outlet end, and a quantity of filtering material is disposed inside the elongated tube between the inlet end and the porous membrane.

Various features and advantages will appear from the description to follow. In the description, reference is made to the accompanying drawings which form a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the accompanying drawings wherein like reference numerals represent like parts.

DETAILED DESCRIPTION OF PREFERRED EMBODIMENTS

Figure 1:
FIG. 1 is a side view of one embodiment of an orally operable, portable, water filtration device constructed according to the teachings of the present invention.

Referring now to the drawings and in particular to FIG. 1, there is shown one embodiment of an orally operable, portable, water filtration device, the device being constructed according to the teachings of the present invention and represented generally by reference numeral 11.

Figure 2:
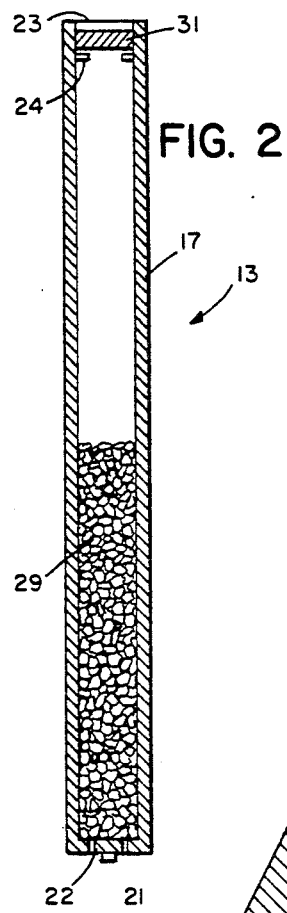
FIG. 2 is a section view of the filtration assembly shown in FIG. 1.

Device 11 includes a filtration assembly 13 and a mouthpiece 15. Referring now to FIG. 2, there is shown a section view of filtration assembly 13.

Filtration assembly 13 includes an elongated tube 17, which is a unitary structure made of polystyrene or another similar material. Tube 17 has an inlet end 21 and an outlet end 23. Tube 17 also has an integrally formed internal ledge 24 for mounting thereon a porous membrane to be described below. Preferably, tube 17 has a length of approximately 6 inches, an inner diameter of approximately 0.5 inch, and a wall thickness of approximately 0.025±0.005 inch. In addition, tube 17 preferably tapers inwardly approximately 1/32 inch in the direction of inlet end 21.

Figure 3:
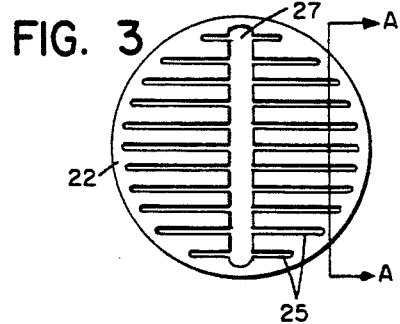
FIG. 3 is an enlarged plan view taken from the bottom of the elongated tube of FIG. 2.
Figure 4:
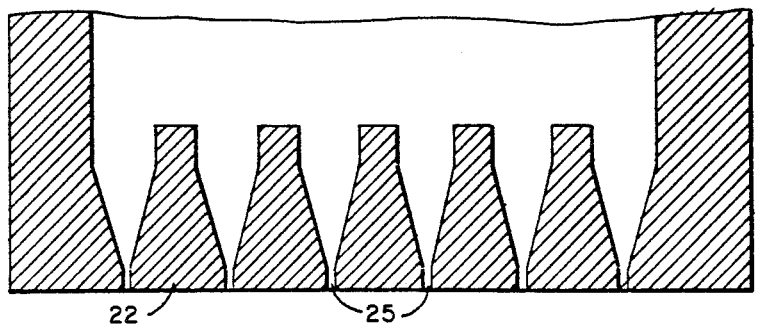
FIG. 4 is an enlarged section view taken along line A—A of FIG. 3.

Referring now to FIGS. 3 and 4, it can be seen that inlet end 21 includes an integrally formed screen 22 whose openings are preferably in the form of slits 25. Preferably, slits 25 have a width of approximately 0.005±0.003 inch and a length varying from approximately 1/16 to ¼ inch (depending on their location on the screen) so that slits 25 are large enough to permit the entry of water into tube 17 but, at the same time, are small enough to prevent the entry of many types of pollutants thereinto and, as will be discussed below, are small enough to prevent the leakage of filtering material from tube 17. Preferably, slits 25 are spaced apart by approximately 0.055±0.005 inch.

Screen 22 also includes a diametrically disposed rib 27. Rib 27 provides support to screen 22 in order to prevent slits 25 from becoming damaged by the trapping of pollutants therebetween. Rib 27 also serves to elevate tube 17 so that when device 11 is used, for example, to drink water from a glass having a flat bottom, a vacuum is not created between the bottom of the tube and the bottom of the glass. Preferably, rib 27 has a width of approximately 1/32 inch and a height of approximately 1/16 inch.

Referring back to FIG. 2, assembly 13 also includes a bed of filtering material 29, such as granulated activated carbon (G.A.C.), G.A.C. impregnated with metallic silver or other similar materials. It has been found that optimal results (measured in terms of filtering efficacy and the ease with which water is sucked through the device) are obtained when the ratio of bed height to bed diameter is approximately 7:1 and when G.A.C. (or G.A.C. impregnated with metallic silver) of the grind size 1230 is used.

Finally, assembly 13 includes a porous membrane 31 disposed on top of lip 24. Membrane 31, which preferably has a porosity of approximately 5–8 microns, is preferably made of polypropylene or other similar materials.

Figure 5:
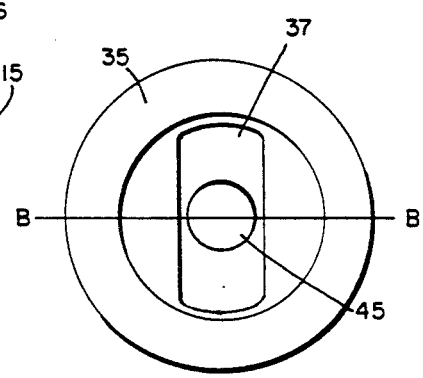
FIG. 5 is an enlarged top plan view of the mouthpiece shown in FIG. 1.
Figure 6:
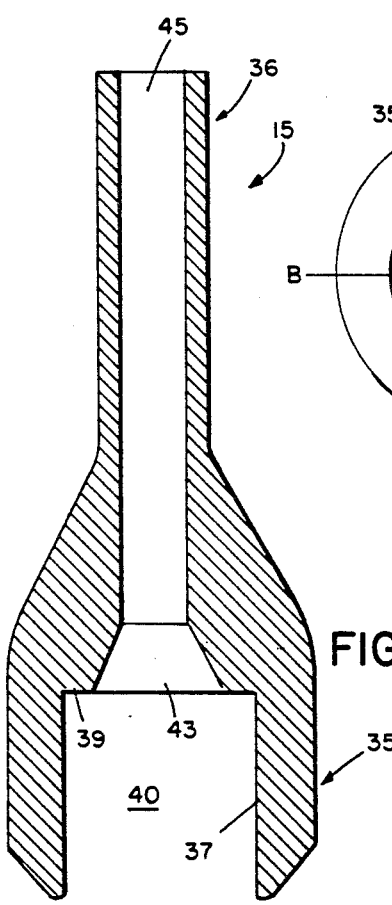
FIG. 6 is an enlarged section view taken along line B—B of FIG. 5.

Referring now to FIGS. 5–7, there are shown various views of mouthpiece 15. Mouthpiece 15, which is an elongated, hollow, unitary structure preferably 2.375 inches in length and made of polystyrene or another similar material, includes a generally cylindrical base portion 35 and an oval-shaped tip 36, the tip being designed for insertion into the mouth of a person. Base portion 35 includes an inner wall 37 and a top wall 39 which together define a chamber 40 into which the top of assembly 13 is inserted for assembly.

Mouthpiece 15 includes an inlet 43 and an outlet 45. Inlet 43 is so disposed that, when mouthpiece 15 is mounted onto assembly 13, the inside of mouthpiece 15 and the inside of assembly 13 are in fluid communication. Outlet 45 is preferably a circular hole having a diameter of 0.100 inch.

To use the subject invention, inlet end 21 is inserted into a source of water. The user then places his mouth over mouthpiece 15 and, much as in the nature of a straw, sucks the water inward. Slits 25 prevent most of the pollutants in the water having a size at least 0.005±0.003 inch from entering tube 17. The water that does enter tube 17 is then subjected to filtering material 29, which removes many of the pollutants having a size at least 5–10 microns and which removes odors and tastes from the water, making the water more palatable to drink. Finally, the water is subjected to membrane 31 which removes most of the remaining pollutants having a size at least 5–8 microns. The water, thus filtered, is then sucked up through outlet 45 and into the mouth of the user.

In another embodiment (not shown), purifying material, in addition to filtering material 29, is disposed inside tube 17.

The embodiments of the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An orally operable, portable, water filtration device comprising:
   a) an elongated tube having an inlet end and an outlet end, said inlet end including an integrally formed screen;
   b) a porous membrane mounted within said elongated tube proximate to said outlet end; and
   c) filtering material disposed within said elongated tube between said inlet end and said porous membrane.

2. The orally operable, portable, water filtration device of claim 1 wherein said screen has openings in the form of slits.

3. The orally operable, portable, water filtration device of claim 2 wherein the width of said slits is approximately 0.005±0.003 inch.

4. The orally operable, portable, water filtration device of claim 1 wherein said elongated tube is made of polystyrene.

5. The orally operable, portable, water filtration device of claim 1 wherein the pore size of said porous membrane is approximately 5–8 microns.

6. The orally operable, portable, water filtration device of claim 5 wherein said porous membrane is made of polypropylene.

7. The orally operable, portable, water filtration device of claim 1 wherein said filtering material is a bed of granulated activated carbon.

8. The orally operable, portable, water filtration device of claim 7 wherein said granulated activated carbon is impregnated with metallic silver.

9. The orally operable, portable, water filtration device of claim 7 wherein the ratio of bed height to bed diameter for said bed of granulated activated carbon is approximately 7:1.

10. The orally operable, portable, water filtration device of claim 7 wherein said granulated activated carbon has a grind size of 1230.

11. The orally operable, portable, water filtration device as claimed in claim 1 wherein said inlet end includes means for elevating said elongated tube.

12. The orally operable, portable, water filtration device of claim 1 further comprising a mouthpiece having an inlet and an outlet, said mouthpiece being mounted over said outlet end of said elongated tube so that said mouthpiece and said elongated tube are in fluid communication.

* * * * *